(12) United States Patent
Earls (10) Patent No.: US 11,780,042 B2
(45) Date of Patent: Oct. 10, 2023

(54) SAW MOUNT GUIDE

(71) Applicant: Jason Scott Earls, Morristown, TN (US)

(72) Inventor: Jason Scott Earls, Morristown, TN (US)

(*) Notice: Subject to any disclaimer, the term of this patent is extended or adjusted under 35 U.S.C. 154(b) by 248 days.

(21) Appl. No.: 17/015,636

(22) Filed: Sep. 9, 2020

(65) Prior Publication Data

US 2022/0072670 A1    Mar. 10, 2022

(51) Int. Cl.
*B23Q 9/00* (2006.01)
*B27B 17/00* (2006.01)
*B23D 59/00* (2006.01)

(52) U.S. Cl.
CPC ......... *B23Q 9/0078* (2013.01); *B23D 59/007* (2013.01); *B27B 17/0083* (2013.01)

(58) Field of Classification Search
CPC . Y10T 83/7697; Y10T 83/667; Y10T 83/674; Y10T 83/68; Y10T 83/707; B23Q 9/0078; B23Q 9/0064; B23Q 9/0071; B23Q 9/0085; B23Q 9/02; B23Q 9/0042; B23Q 9/0028; B23Q 9/005; B27B 17/00; B27B 17/06
USPC ............................................ 30/381, 371–377
See application file for complete search history.

(56) References Cited

U.S. PATENT DOCUMENTS

| | | |
|---|---|---|
| 2,617,452 A | 11/1952 | Dowling, Sr. |
| 2,735,455 A | 2/1956 | Forsberge |
| 3,124,176 A | 3/1964 | Vogini |
| 3,731,380 A | 5/1973 | Mathieson |
| 3,893,372 A * | 7/1975 | Strakeljahn ............. B24B 23/08 144/136.95 |
| 4,179,965 A | 12/1979 | Johnson |
| 4,283,980 A | 8/1981 | Jackson |
| 4,353,399 A | 10/1982 | Harris |
| 4,611,521 A | 9/1986 | McCardle |
| 4,685,369 A | 8/1987 | Beamer |
| 4,726,274 A * | 2/1988 | Pitoni .................. B23Q 9/0014 83/745 |
| 4,854,206 A | 8/1989 | Wilfong |
| 5,107,594 A | 4/1992 | Ferreras |
| 5,568,758 A | 10/1996 | Moore |
| 6,038,775 A | 3/2000 | Holladay |
| 6,503,032 B1 * | 1/2003 | Simonsson .......... B23Q 9/0042 409/177 |
| 8,801,346 B2 * | 8/2014 | Su ............................ B26D 3/02 409/138 |

(Continued)

FOREIGN PATENT DOCUMENTS

| | | |
|---|---|---|
| AU | 2207792 | 3/1993 |
| CA | 2541734 | 10/2007 |

(Continued)

*Primary Examiner* — Phong H Nguyen
(74) *Attorney, Agent, or Firm* — Robinson IP Law, PLLC (57) ABSTRACT

A saw mount for removably securing a saw to an object for cutting of the object includes: a base shaped to fit against a surface of the object; an arm extending from the base from a first end proximate to the base to a second end that is distal from the base; and a saw bracket pivotally mounted towards the distal end of the arm. The saw is removably secured to the saw bracket towards the distal end of the arm such that the saw pivots with respect to the base of the saw mount for cutting of the object by the saw.

15 Claims, 8 Drawing Sheets

(56) References Cited

U.S. PATENT DOCUMENTS

| | | |
|---|---|---|
| 9,919,413 B2 | 3/2018 | Smollar |
| 2004/0020061 A1 | 2/2004 | O'Banion |
| 2017/0165827 A1 | 6/2017 | Smollar |
| 2018/0141233 A1 | 5/2018 | Charest et al. |

FOREIGN PATENT DOCUMENTS

| | | |
|---|---|---|
| CZ | 295592 | 8/1993 |
| DE | 3108856 | 12/1981 |
| DE | 3117959 | 12/1982 |
| DE | 8505686 | 7/1985 |
| DE | 8801871 | 6/1988 |
| DE | 8809928 | 11/1988 |
| EP | 1160062 | 12/2001 |
| KR | 1020150123118 | 11/2015 |
| KR | 101596130 | 2/2016 |
| SK | 277746 | 11/1994 |
| WO | WO03004231 | 1/2003 |

\* cited by examiner

SAW MOUNT GUIDE

FIELD

This disclosure relates to the field of cutting tools including saws. More particularly, this disclosure relates to a guide or mount for supporting a saw for cutting a post or other object.

BACKGROUND

Saws, such as chainsaws, are useful for cutting objects such as boards, beams, posts, and other objects. For example, a chainsaw may be used to cut wooden boards or posts. Although useful, it may be difficult to make precise even cuts with a chainsaw. A chainsaw is typically operated by hand, and it may be difficult to hold the chainsaw to make a straight or even cut of a post or board. In particular, when cutting posts, such as for a fence, turning a chainsaw horizontally may an even cut of the post difficult. Further, it may be dangerous to attempt to orient a saw to make a cut of a post.

Although various saw guides may be available, existing guides may require a specialized saw to be used with the guide. Other guides may be cumbersome and difficult to install at a desired location, or otherwise may require that a post or beam be laid on a table for cutting. Existing guides may not be suitable for cutting objects in place, such as a fence post or other similar object.

What is needed, therefore, is a mount for supporting a cutting tool such as a chainsaw thereon such that an even cut may be made of a post or other object to be cut.

SUMMARY

The above and other needs are met by a mount for supporting a cutting tool such as a chainsaw thereon such that an even cut may be made of a post or other object to be cut. In a first aspect, a saw mount for removably securing a saw to an object for cutting of the object includes: a base shaped to fit against a surface of the object; an arm extending from the base from a first end proximate to the base to a second end that is distal from the base; and a saw bracket pivotally mounted towards the distal end of the arm. The saw is removably secured to the saw bracket towards the distal end of the arm such that the saw pivots with respect to the base of the saw mount for cutting of the object by the saw.

In one embodiment, the base further includes a first base member joined to a second base member. In another embodiment, the first base member is joined to the second base member at an angle of approximately 90 degrees between first base member and the second base member.

In yet another embodiment, the saw mount further includes at least one standoff secured to the saw bracket, wherein the saw is mounted on the at least one standoff such that the at least one standoff is located between the saw and the saw bracket. In one embodiment, the saw bracket further includes at least one slot formed therethrough, wherein the at least one standoff is adjustably mounted on the saw bracket at the slot formed therethrough.

In another embodiment, the saw is a chainsaw. In yet another embodiment, the saw mount further includes a wedge. The wedge is locatable between the base and the object to secure the saw mount to the object at an angle relative to the object.

In one embodiment, the saw bracket is secured to the arm of the saw mount at one of a bushing or bearing. In another embodiment, the saw bracket is secured to the saw at one or more threaded posts on the saw.

In a second aspect, a saw mount for removably securing a saw to an object for cutting of the object including: a base shaped to fit against a surface of the object; an arm extending from the base from a first end proximate to the base to a second end that is distal from the base; and a saw bracket pivotally mounted towards the distal end of the arm; at least one standoff secured to the saw bracket. The saw is removably secured to the saw bracket towards the distal end of the arm such that the saw pivots with respect to the base of the saw mount for cutting of the object by the saw. The saw is mounted on the at least one standoff such that the at least one standoff is located between the saw and the saw bracket.

In one embodiment, the base further includes a first base member joined to a second base member.

In a third aspect, a saw mount for removably securing a saw to an object for cutting of the object includes: a base shaped to fit against a surface of the object; an arm extending from the base from a first end proximate to the base to a second end that is distal from the base; and a saw bracket pivotally mounted towards the distal end of the arm; at least one standoff secured to the saw bracket. The saw is removably secured to the saw bracket towards the distal end of the arm such that the saw pivots with respect to the base of the saw mount for cutting of the object by the saw. The saw is mounted on the at least one standoff such that the at least one standoff is located between the saw and the saw bracket. The saw bracket is secured to the saw at a pair of threaded posts on the saw.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
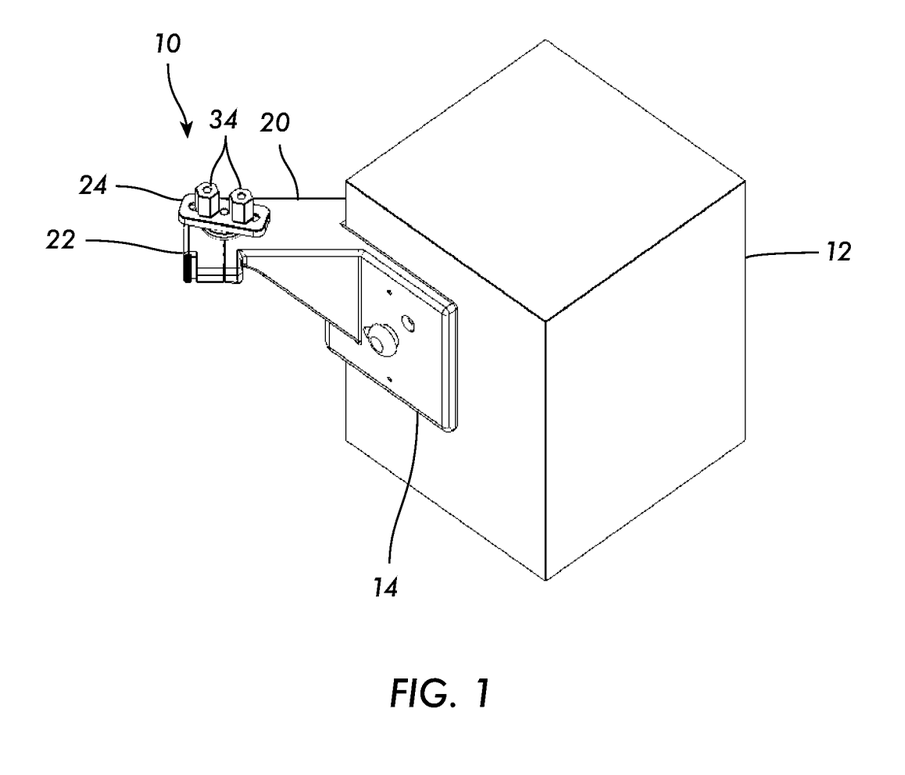
FIG. 1 shows a perspective view of a saw mount according to one embodiment of the presented disclosure.

FIG. 1 shows a basic embodiment of a saw mount 10. The saw mount 10 is preferably adapted to be mounted on an object, such as a post 12. The saw mount 10 may support a saw on the saw mount 10 for cutting the post 12 at a desired location. The saw mount 10 advantageously allows for a saw, such as a chainsaw, to be easily supported on the saw mount 10 and to make a enable a level cut to be made of the post 12 with the saw. The saw mount 10 is readily secured on the post 12, such as with a strap or fasteners as described in greater detail below.

The saw mount 10 may be shaped to be mounted on the post 12. For example, the post 12 may be rectangular in shape, and the saw mount 10 may be shaped to be mounted on a corner of the rectangular post 12 as shown in FIG. 1. Alternatively, the saw mount 10 may be adapted to be mounted on the post 12 when the post 12 is formed in various other shapes. For example, if the post 12 is round or cylindrical in shape, the saw mount 10 may be mountable on the round post 12.

Figure 2:
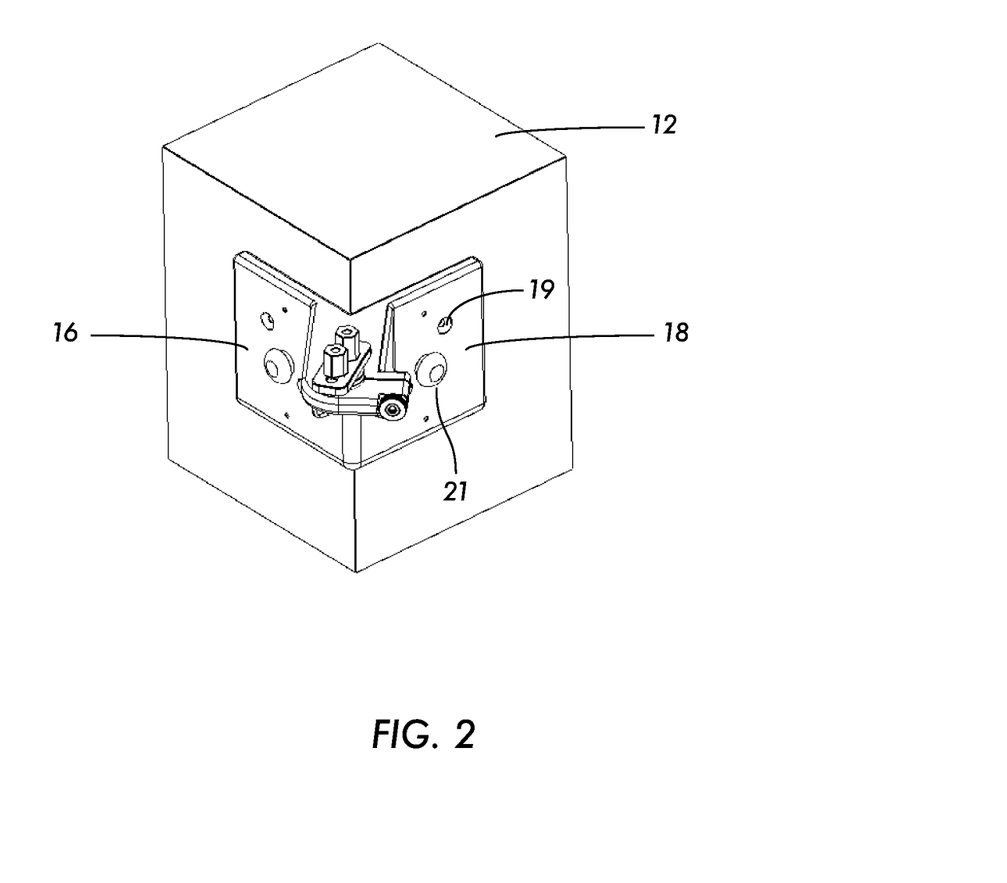
FIG. 2 shows a perspective side view of a saw mount according to one embodiment of the present disclosure.

With further reference to FIG. 1, the saw mount 10 includes a base 14 that may be shaped to fit against the post 12. As shown in FIG. 2, the base 14 may include, for example, two substantially planar members joined to each other at an angle such that the two planar members rest substantially against a surface of the post 12. A first base member 16 may be jointed to a second base member 18 along edges of the first base member 16 and the second base member 18. The first base member 16 may be joined to the second base member 18 at an angle of approximately 90 degrees, such that the base 14 is shaped to fit against a rectangular post at a corner of the post. However, it is also understood that an angle of the first base member 16 relative to the second base member 18 may vary depending on a desired object on which the saw mount 10 is located. In one embodiment, the base 14 may be semi-circular in shape, such as to conform to a surface of a round post.

Referring to FIG. 2, the base 14 may include one or more bores 19 formed therethrough. The bores 20 may be shaped to receive a fastener, such as a screw, therethrough to secure the base 14 and the saw mount 10 to the post 12. For example, when the post 12 is formed of wood, a polymer, or other similar materials, a screw may be inserted through the one or more bores 19 and into a surface of the post 12 to secure the base 14 to the post 12. The base 14 may further include one or more tabs 21 projecting therefrom. The tabs 21 may be used to secure the base 14 to the post 12, such as using a strap or band located around the post 12 and securing the base 14 to the post 12.

Figure 3:
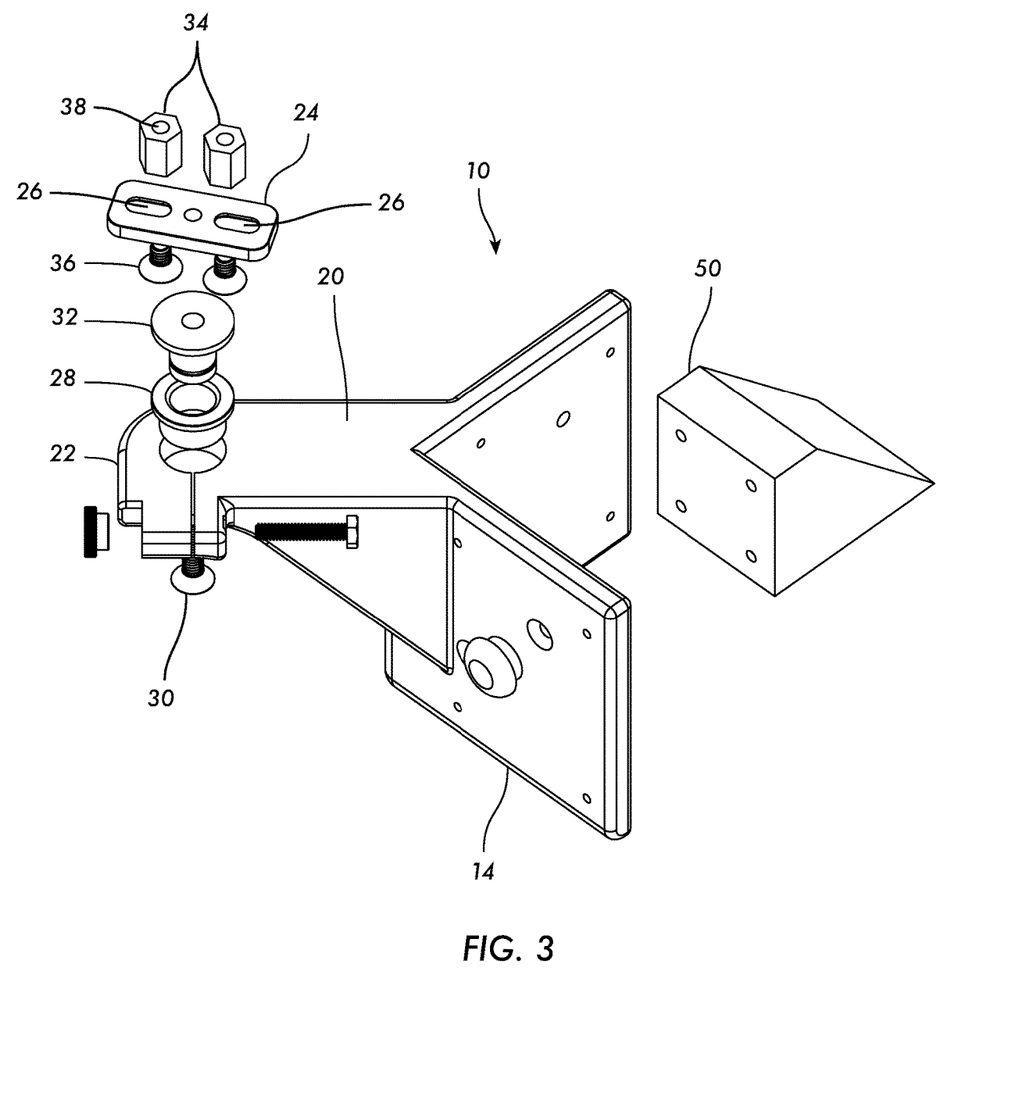
FIG. 3 shows an exploded view of a saw mount according to one embodiment of the present disclosure.

The saw mount 10 further includes an arm 20 attached to the base 14 and extending from the base 14 relative to the post 12. The arm 20 extends from a first end that is proximate to the base 14 to a distal end 22. The saw mount 10 includes a saw bracket 24 pivotally mounted on the arm 20. Referring to FIG. 3, the saw bracket 24 may include a pair of slots 26 formed therethrough. The saw bracket 24 may be pivotally mounted on the arm 20, such as with a bearing or bushing 28 located on the arm 20. The saw bracket 24 may be secured to the arm 20 with a fastener 30 inserted through the arm. The fastener 30 may be secured to the saw bracket 24, such as by threading the fastener 30 into the saw bracket 24. The fastener 30 may be spaced at least partially above a surface of the arm 20, such as with a post 32, such that the saw bracket 24 may pivot or rotate with respect to the arm 20 without contacting the arm 20.

The saw mount 10 includes a pair of standoffs 34. Each of the pair of standoffs 34 are is preferably secured to the saw bracket 24 at one of the pair of slots 26. The pair of standoffs 34 is preferably secured to the saw bracket 24 with a standoff fastener 36. The standoff fastener 36 is preferably mounted flush to an underside of the saw bracket 24 such the standoff fastener 36 does not contact the arm 20 during pivoting or rotation of the saw bracket 24. The pair of standoffs 34 are adjustably mounted on the saw bracket 24 on the pair of slots 26 such that a location of the pair of standoffs 34 may be adjusted along the saw bracket 24 when mounting a saw, as discussed in greater detail below. Each of the pair of standoffs 34 may include a threaded bore 38 formed through ends of the standoffs 34 for securing the standoffs 34 on one or more threaded bolts of a saw, as described below. The pair of standoffs 34 are preferably shaped having a hexagonal or other similar shape such that the pair of standoffs 34 may be engaged by a tool, such as a wrench, when securing the pair of standoffs 34 to a saw or other device as discussed below.

Figure 4:
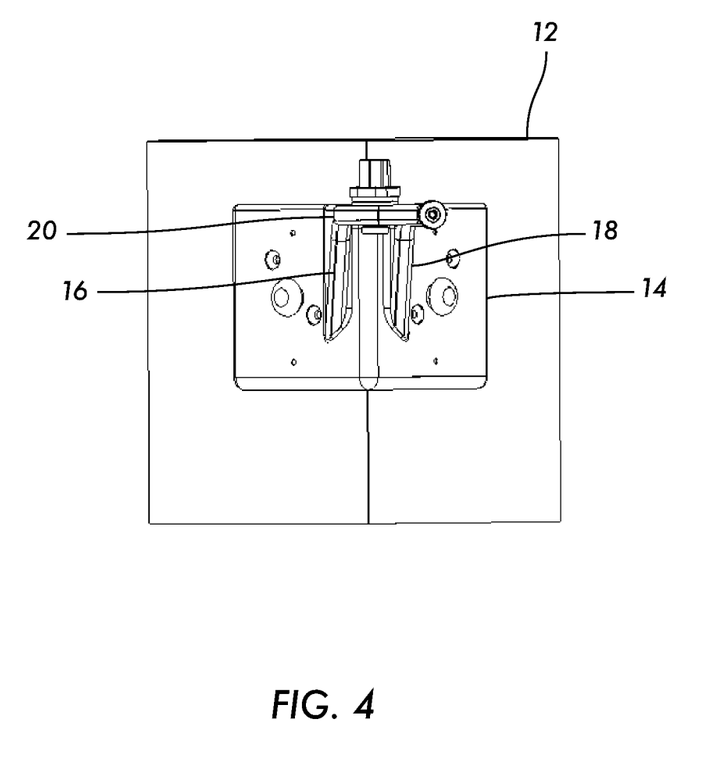
FIG. 4 shows a side plan view of a saw mount according to one embodiment of the present disclosure.

Referring to FIG. 4, the arm 20 may be supported on the base 14 with one or more gussets 40 located between the arm 20 and the base 14. For example, a pair of gussets 40 may be located between the bar and the first base member 16 and the second base member 18.

Figure 5:
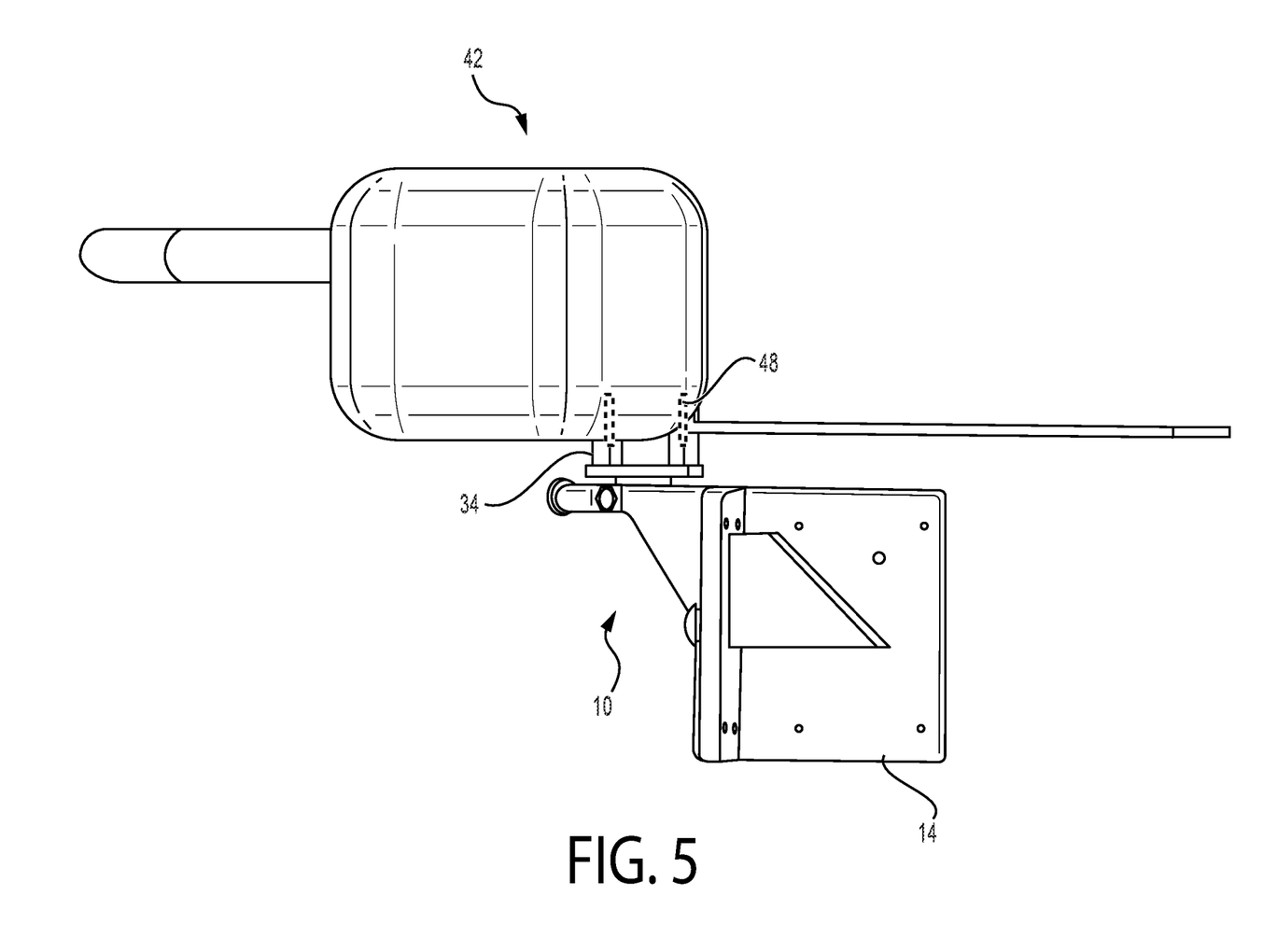
FIG. 5 shows a side view of a saw mount with a saw mounted thereon according to one embodiment of the present disclosure.

Referring to FIG. 5, the saw mount 10 is configured to support a saw, such as a chainsaw 42 on the saw mount 10. The chainsaw 42 may be secured to the saw mount 10 at the pair of standoffs 34. The chainsaw 42 may include a chainsaw bar 44 for supporting a chain of the chainsaw 42. The chainsaw bar 44 may be adjustably or removably attached to a chainsaw body 46. The chainsaw bar 44 may be secured to the chainsaw body 46, such as with a pair of threaded posts 48.

To mount the chainsaw 42 to the saw mount 10, any nuts or other hardware secured on the pair of threaded posts 48 of the chainsaw 42 may be removed. The pair of standoffs 34 may then be secured to the threaded posts 48 of the saw. The saw bracket 24 may then be secured to the pair of standoffs 34, such as with the standoff fasteners 36. The chainsaw 42 and attached saw bracket 24 may be secured to the arm 20, which is secured to the post 12 or other object. The chainsaw 24 is pivotally secured to the saw mount 10 such that the chainsaw 42 may be pivoted on the saw mount 10 to cut the post 12. Although the above contemplates mounting the chainsaw 42 to the saw mount 10 at the threaded posts 48 of the chainsaw 42, it is also understood that the chainsaw 42 may be secured to the saw mount 10 with a single threaded post, or with more than two threaded posts.

Figure 6:
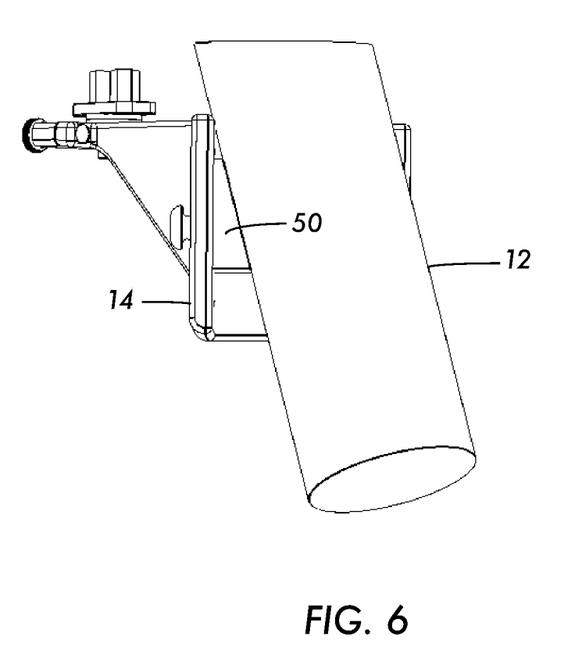
FIGS. 6-8 show a saw mount secured on a post at an angle according to embodiments of the present disclosure.
Figure 7:
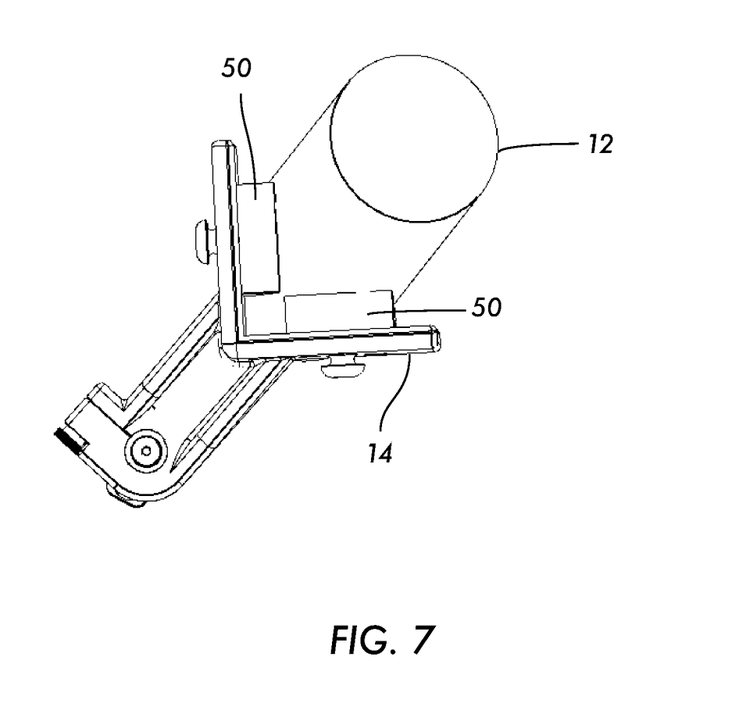
Figure 8:
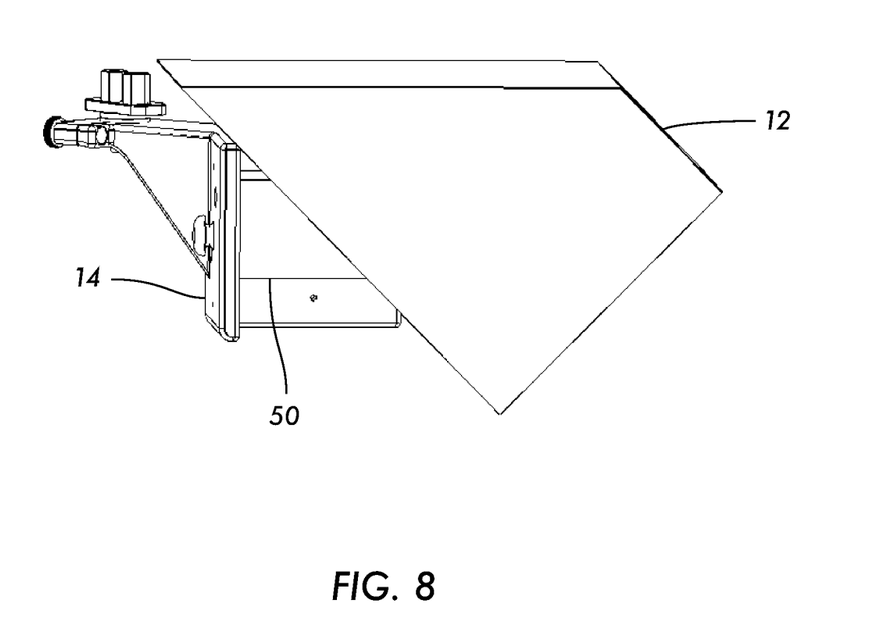

Referring again to FIG. 3, the saw mount 10 may further include a wedge 50 for securing the saw mount 10 to the post 12 at an angle or to aid in securing the saw mount 10 to a shape of the post 12. For example, as shown in FIGS. 6-8, the wedge 50 may be located between the base 14 and the post 12 such that the saw mount 10 is securable to the post 12 at an angle. A pair of wedges 50 may be located between the base 14 and the post 12, as shown in FIG. 7.

Embodiments of the saw mount 10 described herein advantageously enable a saw, such as a chainsaw, to be secured on a post or other similar object for cutting of the post or other object. The saw mount allows a chainsaw to mounted to an object for cutting the object without requiring substantial modification to the chainsaw. Further, the saw mount allows a substantially straight or accurate line to be cut through the object.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A combination of a chainsaw and a saw mount for removably securing the chainsaw to an object, comprising:
   the chainsaw including one or more threaded posts securing a bar of the chainsaw to a body of the chainsaw; and
   the saw mount including:
   a base shaped to fit against a surface of the object;
   an arm extending from the base from a first end proximate to the base to a second end that is distal from the base; and
   a saw bracket pivotally mounted towards the distal end of the arm;
   one or more standoffs located on the saw bracket, the one or more standoffs having a threaded portion formed therein for threadably securing the one or more standoffs to the one or more threaded posts securing the bar of the chainsaw to the body of the chainsaw;
   wherein the chainsaw is removably secured to the distal end of the arm by the one or more standoffs such that the chainsaw pivots with respect to the base of the saw mount for cutting of the object when the chainsaw is secured on the saw mount.

2. The saw mount of claim 1, the base comprising a first base member joined to a second base member.

3. The saw mount of claim 2, wherein the first base member is joined to the second base member at an angle of approximately 90 degrees between first base member and the second base member.

4. The saw mount of claim 1, the saw bracket further comprising at least one slot formed therethrough, wherein the one or more standoffs are adjustably mounted on the saw bracket at the slot formed therethrough.

5. The saw mount of claim 1, further comprising a wedge, wherein the wedge is locatable between the base and the object to secure the saw mount to the object at an angle relative to the object.

6. The saw mount of claim 1, wherein the saw bracket is pivotally secured to the arm of the saw mount at one of a bushing or bearing.

7. The saw mount of claim 1, wherein the chainsaw is removably secured to the saw bracket towards the distal end of the arm.

8. The saw mount of claim 1, wherein the one or more standoffs comprises a single standoff.

9. A combination of a chainsaw and a saw mount for removably securing the chainsaw to an object, comprising:
   the chainsaw including one or more threaded posts securing a bar of the chainsaw to a body of the chainsaw; and
   the saw mount including:
   a base shaped to fit against a surface of the object;
   an arm extending from the base from a first end proximate to the base to a second end that is distal from the base; and
   a saw bracket pivotally mounted towards the distal end of the arm;
   one or more standoffs located on the saw bracket, the one or more standoffs having a threaded portion formed therein for threadably securing the one or more standoffs to the one or more threaded posts securing the bar of the chainsaw to the body of the chainsaw;
   wherein the chainsaw is removably secured to the distal end of the arm by the one or more standoffs such that the chainsaw pivots with respect to the base of the saw mount for cutting of the object when the chainsaw is secured on the saw mount; and
   wherein the saw is mounted on the one or more standoffs such that the one or more standoffs are located between the saw and the saw bracket to space the chainsaw apart from the saw bracket.

10. The saw mount of claim 9, the base comprising a first base member joined to a second base member.

11. The saw mount of claim 9, wherein the chainsaw is removably secured to the saw bracket towards the distal end of the arm.

12. The saw mount of claim 9, wherein the one or more standoffs comprises a single standoff.

13. A method of securing a chainsaw to an object for cutting the object with the chainsaw, the method comprising:
   providing a chainsaw including one or more threaded posts securing a bar of the chainsaw to a body of the chainsaw; and
   providing a saw mount including:
   a base shaped to fit against a surface of the object;
   an arm extending from the base from a first end proximate to the base to a second end that is distal from the base; and
   a saw bracket pivotally mounted towards the distal end of the arm, the saw bracket including one or more standoffs having threaded ends;
   removing one or more nuts securing the bar of the chainsaw to the one or more threaded posts on the body of the chainsaw;
   threadably securing the one or more standoffs of the saw bracket to the one or more threaded posts on the body of the chainsaw; and
   securing the one or more standoffs to the saw bracket such that the chainsaw is mounted on the saw mount.

14. The method of claim 13, wherein the chainsaw is removably secured to the saw bracket towards the distal end of the arm.

15. The method of claim 13, wherein the one or more standoffs comprises a single standoff.

* * * * *